United States Patent [19]
Tajime

[11] 3,712,630
[45] Jan. 23, 1973

[54] SPINDLE DEVICE FOR AN AUTOMATIC RECORD CHANGER

[75] Inventor: Koichi Tajime, Yokohama, Japan

[73] Assignee: Victor Company of Japan, Limited, Yokohama, Japan

[22] Filed: July 23, 1970

[21] Appl. No.: 57,619

[30] Foreign Application Priority Data

July 31, 1969 Japan ................................44/59993

[52] U.S. Cl...................................................274/10 S
[51] Int. Cl..............................................G11b 17/04
[58] Field of Search.......................................274/10 S

[56] References Cited

UNITED STATES PATENTS 2,604,325 7/1952 Hansen................................274/10 S
3,201,131 8/1965 Ansar et al..........................274/10 S

FOREIGN PATENTS OR APPLICATIONS 1,023,606 1/1958 Germany............................274/10 S

*Primary Examiner*—Leonard Forman
*Assistant Examiner*—Charles E. Phillips
*Attorney*—Stevens, Davis, Miller and Mosher

[57] ABSTRACT

A spindle device for an automatic record changer comprising a shaft mounted in the axial bore of a spindle for elevational motion therein, and a cam attached to the shaft for elevational motion with the shaft, said cam having a constricted portion in the central portion, a major cam surface in the lower portion and a minor cam surface in the upper portion, hooks and record holders provided to move into and out of the spindle in a direction normal to the axis of the shaft as the cam and shaft move vertically up and down. When the cam and shaft are moved upwardly prior to their downward movement for changing records, shoulders formed near the forward end of each of the record holders are brought into abutting engagement with the edges of the center openings of records held by the hooks, the amount of movements of the holders and the amount of upward movements of the cam and shaft are restricted and the presence or absence of a record held by the hooks can be detected based on the amount of upward movements of the cam and shaft.

5 Claims, 12 Drawing Figures

K. TAJIME
INVENTOR

BY Stevens, Davis, Miller & Mosher
ATTORNEYS

PATENTED JAN 23 1973 3,712,630

SHEET 3 OF 5

SPINDLE DEVICE FOR AN AUTOMATIC RECORD CHANGER

This invention relates to spindle devices for an automatic record changer of gramophones. More particularly, the invention is concerned with a spindle device of the type described which is adapted to support a plurality of records each having a large center opening in a position above a turntable and to drop one record after another onto the turntable without damaging the records.

A principal object of this invention is to provide a spindle device for an automatic record changer which, though simple in construction, is capable of holding a plurality of records and successively dropping one record after another onto a turntable.

Another object of the invention is to provide a spindle device for an automatic record changer which readily detects the presence or absence of records supported thereby.

Still another object of the invention is to provide a spindle device for an automatic record changer which permits the simultaneous removal of all the records piled on the turntable in a stack.

A further object of the invention is to provide a spindle device for an automatic record changer which functions positively even when there are variations in dimensions and mechanical finishes.

Still further object of the invention is to provide a spindle device for an automatic record changer which is very low in cost and which can be produced readily.

Additional objects as well as features and advantages of the present invention will become evident from the description set forth hereinafter when considered in conjunction with the accompanying drawings, in which.

Figures 1, 2, 3:
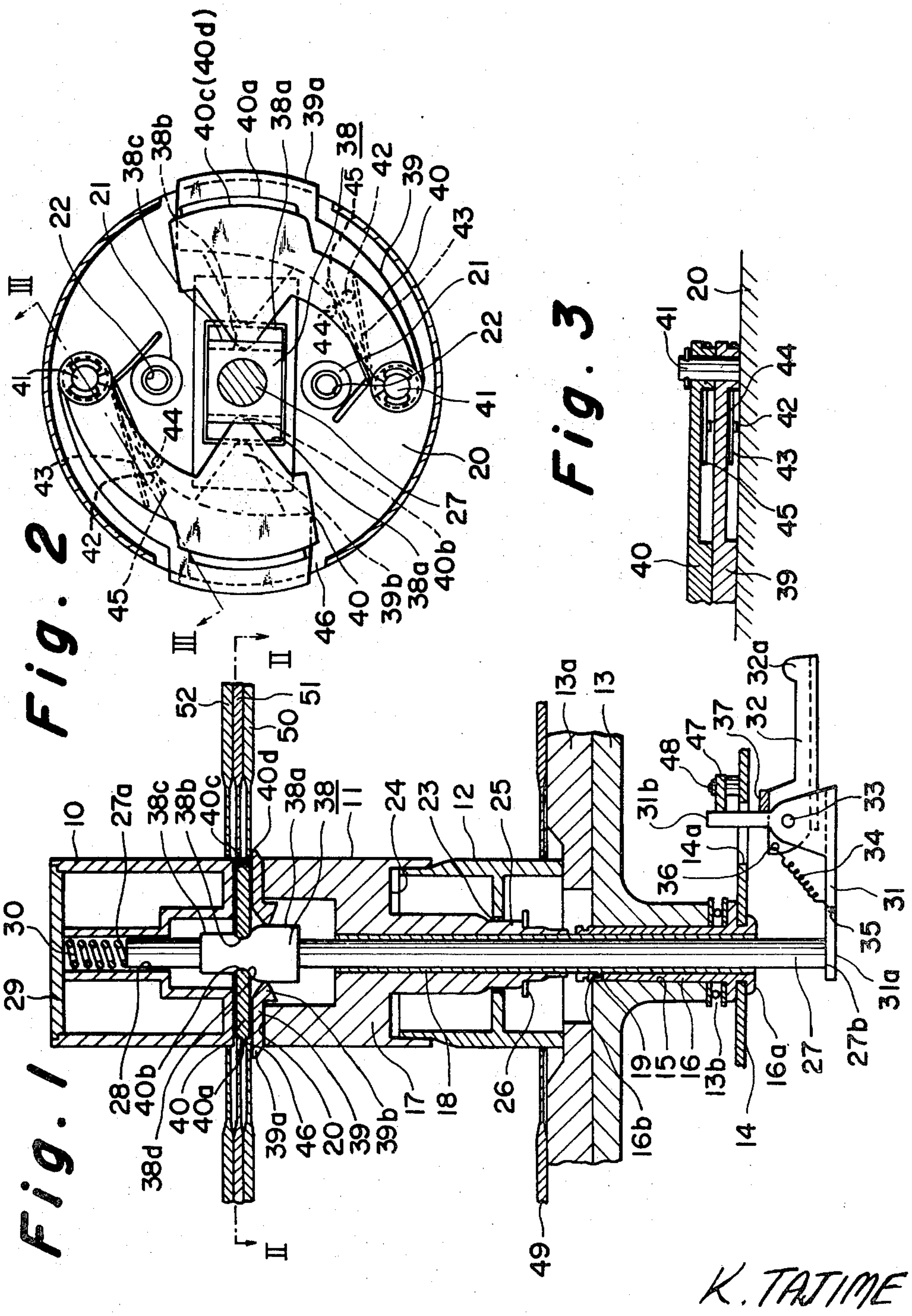
FIG. 1 is a longitudinal sectional view of the spindle device for an automatic record changer comprising one embodiment of the present invention which is shown in its normal state.
FIG. 2 is a sectional view, on an enlarged scale, taken along the line II—II of FIG. 1.
FIG. 3 is a sectional view, on an enlarged scale, taken along the line III—III of FIG. 1.

In one embodiment of the spindle device according to the present invention shown in FIGS. 1 to 6, a spindle comprises a cylindrical head portion 10, body portion 11 and a base 12 of equal diameter. The base 12 of the spindle rests on a covering $13_a$ made of rubber or flet and mounted on the upper surface of a turntable 13 for rotation with the turntable as a unit.

A tubular shaft 16 is inserted in a center opening 15 of the turntable 13 and has a lower end $16_a$ which is firmly secured to a panel 14. A bearing $13_b$ is mounted between the lower end of the base of the turntable 13 and the panel 14. Another tubular shaft 18 secured to a central portion 17 of the spindle body 11 extends from the spindle body 11 to the spindle base 12 to be secured to the upper end of the tubular shaft 16. Means for securing the second tubular shaft 18 to the upper end of the first tubular shaft 16 may include a transversely disposed groove in an upper portion $16_b$ of the shaft 16 and a projection 19 provided in the shaft 18 and received in such groove.

The head 10 of the spindle and the body 11 of the spindle are equal in diameter, with the former being threadably secured, though not shown, to the latter by utilizing tapped holes 22, 22 of a pair of bosses 21, 21. The spindle base 12 of equal diameter is loosely mounted below the spindle body 11. A center projection 25 extending from an under surface 24 of the spindle body 11 is received in a center axial bore 23 of the base 12. A spring washer 26 is mounted on the forward end portion of the center projection 25 which is adapted to prevent the dislodgment of the base 12 from the body 11 when the spindle is removed from the position shown in FIG. 1. As can clearly be seen from the aforesaid construction, the spindle head 10 and spindle body 11 are held against rotation, but the spindle base 12 rotates with the turntable 13 as a unit.

A shaft 27 is inserted for elevational motion in the tubular shaft 18 to extend into the spindle head 10, through spindle body 11, spindle base 12 and turntable 13. The shaft 27 is urged to move downwardly by the biasing force of a compression spring 30 mounted between a cap 29 mounted at the top of the spindle head 10 and an upper end $27_a$ of the shaft 27 disposed in the spindle head 10. The shaft 27 has a lower end $27_b$ which is supported by a first arm $31_a$ of a driven lever 31 which is pivotally supported by a shaft 33 together with a drive lever 32. The driven lever 31 has a second arm $31_b$ disposed vertically to extend through a window $14_a$ formed in the panel 14 in such a manner that the upper end of the second arm $31_b$ is disposed above the panel 14. The two levers 31 and 32 are resiliently connected by a spring 34 mounted between a substantially central portion 35 of the first arm $31_a$ of the driven lever 31 and an end 36 of the drive lever 32 on its pivot side. The drive lever 32 is urged by the biasing force of the spring 34 to move in pivotal motion about the shaft 33 in an anticlockwise direction. The anticlockwise movement of the lever 32 is restricted by a stopper 37 provided on its pivot side when it abuts against the second arm $31_b$ of the lever 31.

Mounted on the shaft 27 substantially midway between the spindle head 10 and spindle body 11 is a cam 38 which is shaped symmetrically with respect to a plane including the center axial line of the shaft 27. The cam 38 has a constricted portion $38_b$ in the center, with a major cam surface $38_a$ being disposed below the central constricted portion $38_b$ and a minor cam surface $38_c$ being disposed above the central constricted portion $38_b$. A pair of hooks 39, 39 and a pair of record holders 40, 40 are disposed in superposed relation and mounted on an upper surface 20 of the spindle body 11 as shown in FIGS. 1 to 3. One hook 39 and one record holder 40 are pivotally supported at one end by a shaft 41, and the other hook 39 and the other record holder 40 are pivotally supported at one end by another shaft 41. Each hook 39 has a free or abutting end $39_b$ which is urged into engagement with the cam 38 by the biasing force of a spring 43 wound on the shaft 41 and having one end secured to a pin 42 attached to the hook and the other end engaging one of the bosses 21. In like manner, each record holder 40 has a free or abutting end $40_b$ which is urged into engagement with the cam 38 by the biasing force of a spring 45 wound on the shaft 41 and having one end secured to a pin 44 attached to the record holder and the other end engaging one of the bosses 21. One hook 39 and one record holder 40 forming a set and the other hook 39 and the other record holder 40 forming another set are arranged symmetrically with respect to the center axial line of the shaft 37. Each hook 39 has a forward end $39_a$ and each record holder 40 has a forward end $40_a$ which are adapted to move into and out of the spindle body 11 through a window 46 formed in the spindle body 11.

Pivotally supported by a shaft 48 attached to the panel 14 is a detection lever 47 which is adapted to come into contact with the lateral surface of the second arm $31_b$ of the driven lever 31.

The operation of the spindle device constructed as aforementioned will now be described. FIG. 1 shows the spindle device in a state in which a record is being played. As shown, a record 49 on the covering $13_a$ of the turntable 13 is being played, and the records 50, 51 and 52 yet to be played rest on the forward ends $39_a$, $39_a$ of a pair of hooks 39, 39 projecting out of the spindle body 11 through the windows 46, 46.

Figures 4, 5:
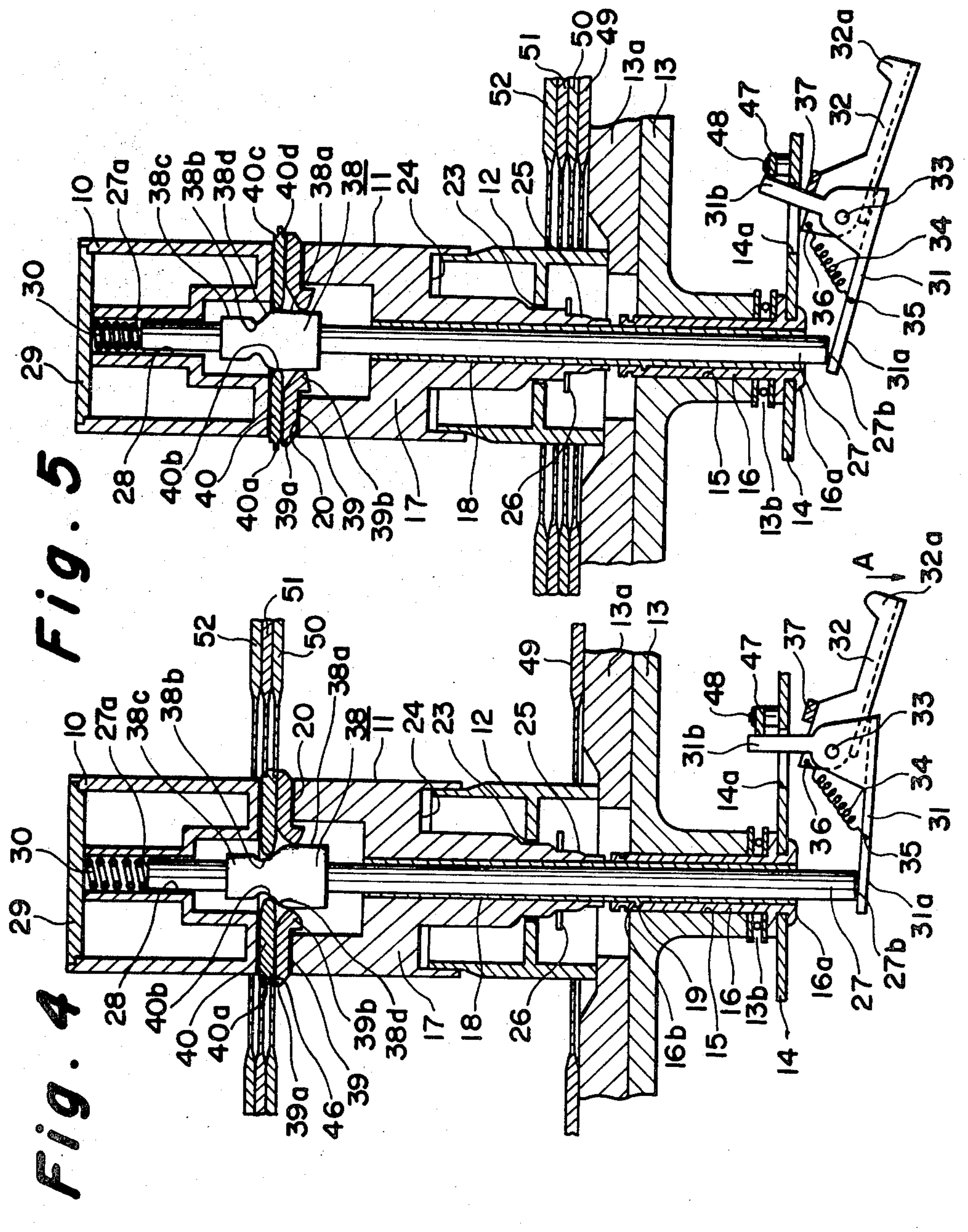
FIG. 4 is a longitudinal sectional view of the spindle device of FIG. 1 showing supported record detection means in operation when there is a record or records supported by the spindle device.
FIG. 5 is a longitudinal sectional view of the spindle device of FIG. 1 showing the supported record detection means in operation when there is no records supported by the spindle device.

When the playing of the record 49 has been completed, a known automatic operation gear (not shown) is set in motion to move the pickup arm upwardly away from the record 49 into a rest position. During this operation, an automatic changing cam (not shown) coupled to the automatic operation gear moves the free end $32_a$ of the drive lever 32 in the direction of the arrow A as shown in FIG. 4. This causes the driven lever 31, which is connected to the drive lever 32 by the spring 34, to move in the same direction.

As a result, the lower end $27_b$ of the shaft 27 is moved upwardly by the first arm $31_a$ of the driven lever 31, resulting in the shaft 27 moving upwardly a small distance. As the shaft 27 move upwardly, the abutting ends $40_b$, $40_b$ of the record holders 40, 40, which are maintained in engagement with the constricted portion $38_b$ of the cam 38, move as they are brought into engagement with the major cam surface $38_a$ of the cam 38. The forward ends $40_a$, $40_a$ of the record holders 40, 40 have a smaller thickness than the bases thereof so that they can be inserted between the records 50 and 51 disposed one over the other. An upper shoulder $40_c$ and a lower shoulder $40_d$ are formed between the forward end $40_a$ and the base of each record holder 40. Thus, the record holders 40, 40 moved away from the cam 38 by a bevelled surface $38_d$ in the constricted portion $38_b$ are restricted in their movements by the upper shoulder $40_c$ and lower shoulder $40_d$ abutting against the inner edges of the center openings of the records 50 and 51. Because of this, the abutting ends $40_b$, $40_b$ of the record holders 40, 40 are prevented from moving to respective positions in which they are in engagement with the major cam surface $38_a$ of the cam 38, and consequently the upward movement of the shaft 27 is limited. Thus, the driven lever 31 can only move slightly in pivotal motion.

When all the records rest on the turntable and no record rests on the hooks 39, 39 as shown in FIG. 5, the record holders 40, 40 can move away from the cam 38 a distance sufficiently great to permit the shaft 27 and the cam 38 mounted thereon to move upwardly a substantial distance. Accordingly, when the drive lever 32 is moved in the direction of the arrow A, the driven lever 31 urged by the biasing force of the spring 34 moves a substantial distance in pivotal motion in the same direction as the drive lever 32. The pivotal movement of the driven lever 31 causes the detection lever 47 to move in pivotal motion about the shaft 48, thereby actuating a shut-off mechanism (not shown) for automatically rendering the device as a whole inoperative.

Figure 6:
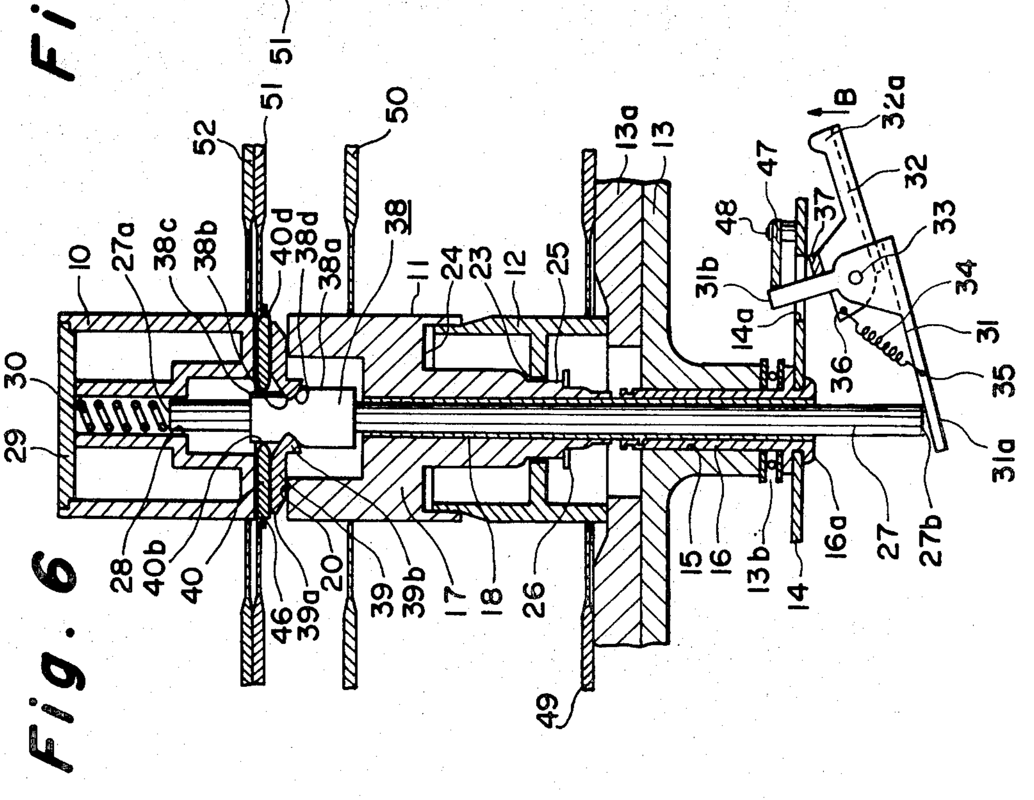
FIG. 6 is a longitudinal sectional view of the spindle device of FIG. 1 when the records are being changed.

A record changing operation will now be explained with reference to FIG. 6. After being moved in the direction of the arrow A as aforementioned, the drive lever 32 is moved in the direction of the arrow B as shown in FIG. 6. The movement of the drive lever 32 in this direction is transmitted directly to the second arm $31_b$ of the driven lever 31 through the stopper 37 of the drive lever 32, so that the lever 31 moves in pivotal motion in an anticlockwise direction about the shaft 33. This permits the shaft 27 to be moved downwardly by the biasing force of the spring 30. As a result, the cam 38 mounted on the shaft 27 also moves downwardly and the abutting ends $40_b$, $40_b$ of the record holders 40, 40 are brought into engagement with the minor cam surface $38_c$ of the cam 38, and the forward ends $40_a$, $40_a$ thereof project slightly out of the spindle body 11 through the windows 46, 46 to support the second record 51 from the bottom. With a slight time lag, each of the abutting ends $39_b$, $39_b$ of the hooks 39, 39 is brought into engagement with the constricted portion $38_b$ of the cam 38, and the forward ends $39_a$, $39_a$ thereof are moved into the spindle body 11. This causes the lowermost record 50 of the records 50, 51 and 52 to be released from engagement with the forward ends $39_a$, $39_a$ of the hooks 39, 39 and dropped onto the turntable 13. As the drive lever 32 and driven lever 31 are restored to their positions shown in FIG. 1, the shaft 27 and cam 38 also move to their positions shown in FIG. 1. Thereafter, the hooks 39, 39 move out of the spindle body 11 and the record holders 40, 40 move into the spindle body 11. Thus, the spindle device is restored to its normal position.

From the foregoing description, it will be appreciated that the present invention provides, in one embodiment, a spindle device which comprises a cam having a constricted portion in the center, a major cam surface disposed below the central constricted portion, which cam is mounted on a shaft for elevational motion in a spindle and operative to cause hooks and record holders to move in and out of the spindle. When records are changed by moving the cam downwardly, the cam is first operated to move upwardly, and the amount of the upward movement of the cam is restricted by restricting the amount of movement of the record holders out of the spindle as the shoulders provided near the forward ends of the record holders abut against the edges of the center openings of the record resting on the spindle. At the same time, the presence or absence of records resting on the spindle can be detected based on the amount of the upward movement of the cam. It is possible to detect the presence or absence of records on the spindle by the simple operation of moving the shaft upwardly prior to changing of records. This arrangement eliminates the need to provide in the spindle special means for detecting the presence or absence of records, and prevents the construction from becoming complex.

FIGS. 7 to 12 show another embodiment of the present invention. Parts appearing in the figures which are similar to those appearing in FIGS. 1 to 6 are designated by like reference characters, and their description will be omitted. In FIGS. 7 to 12, hooks 53, 53 are slidably mounted on the upper surface 20 of the spindle body 11 and each guided by hook guides 54 and 55 to move in and out of the spindle body 11 through windows 56 formed in the wall in the upper portion of the spindle body 11. Each hook 53 is normally urged by a spring 57 to move out of the spindle body 11 through one of the windows 56. Links 59, 59 are pivotally connected at one end portion thereof to each hook 53 by a shaft 58, and a slot 60 is formed at the other end portion thereof. A pin attached to the shaft 27 mounting the cam 38 is received in the slots 60 of the two links 59, 59.

Figures 7, 8, 9:
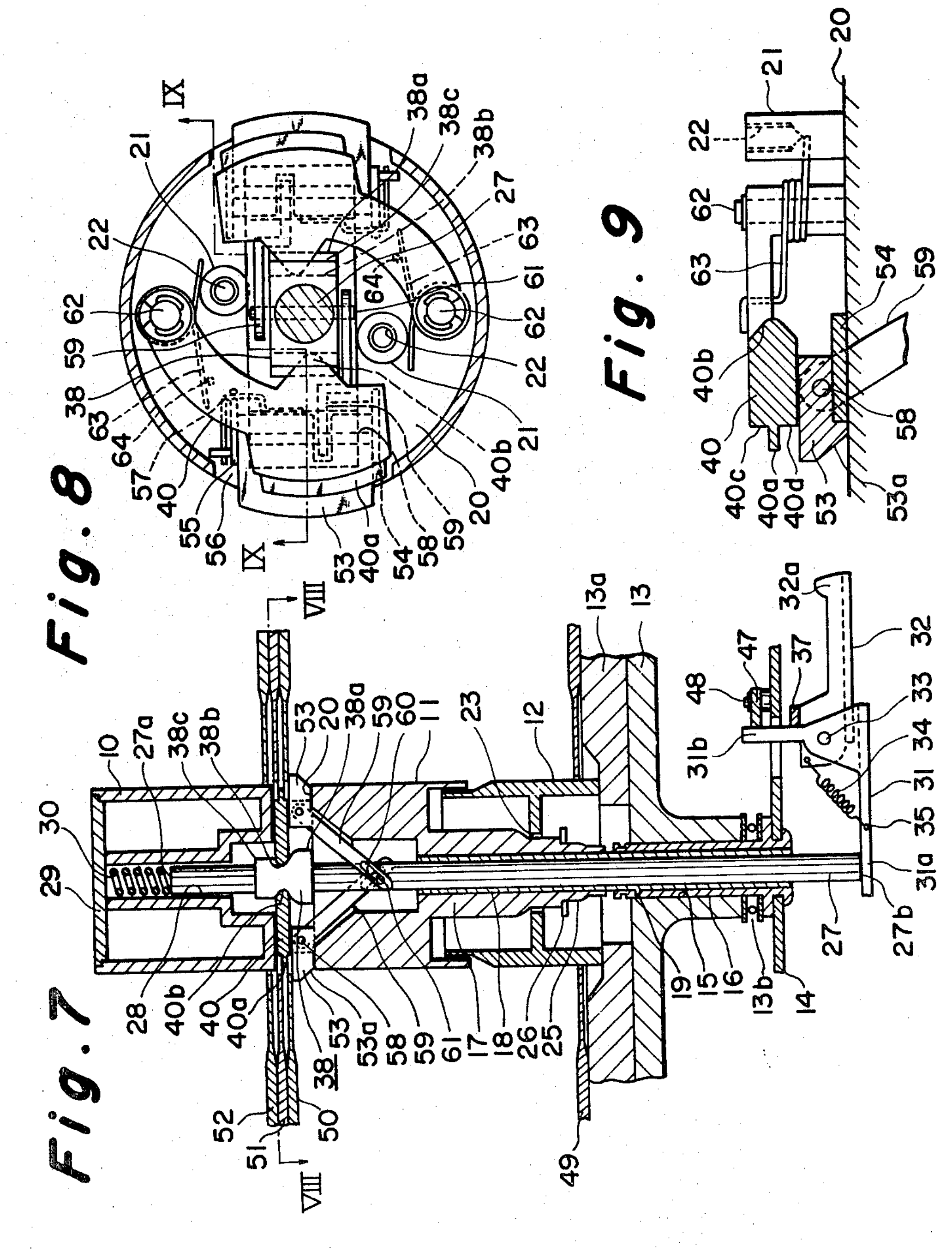
FIG. 7 is a longitudinal sectional view of the spindle device for an automatic record changer comprising another embodiment of the present invention which is shown in its normal state.
FIG. 8 is a sectional view, on an enlarged scale, taken along the line VIII—VIII of FIG. 7.
FIG. 9 is a sectional view, on an enlarged scale, taken along the line IX—IX of FIG. 7.

As shown in FIGS. 8 and 9, record holders 40, 40 are each pivotally supported by a shaft 62. Each of the record holders 40, 40 is urged by the biasing force of a spring 63 wound on the shaft 62 which is secured at one end to a pin 64 attached to the record holder 40 and engaging one of the bosses 21 at the other end, so that the abutting end $40_b$ of each record holder 40 is maintained in abutting engagement with the center constricted portion $38_b$ of the cam 38.

The record holders 40, 40 are superposed on the hooks 53, 53, and the forward ends $40_a$ thereof are adapted to move in and out of the spindle body through the windows 56, 56.

The operation of the spindle device constructed as aforementioned will now be described. FIG. 7 shows the spindle device in a state in which a record is being played. As shown, a record 49 on the turntable 13 is being played, and the records 50, 51 and 52 yet to be played rest on the hooks 53, 53 projecting out of the spindle body 11 through the windows 56, 56.

Figures 10, 11:
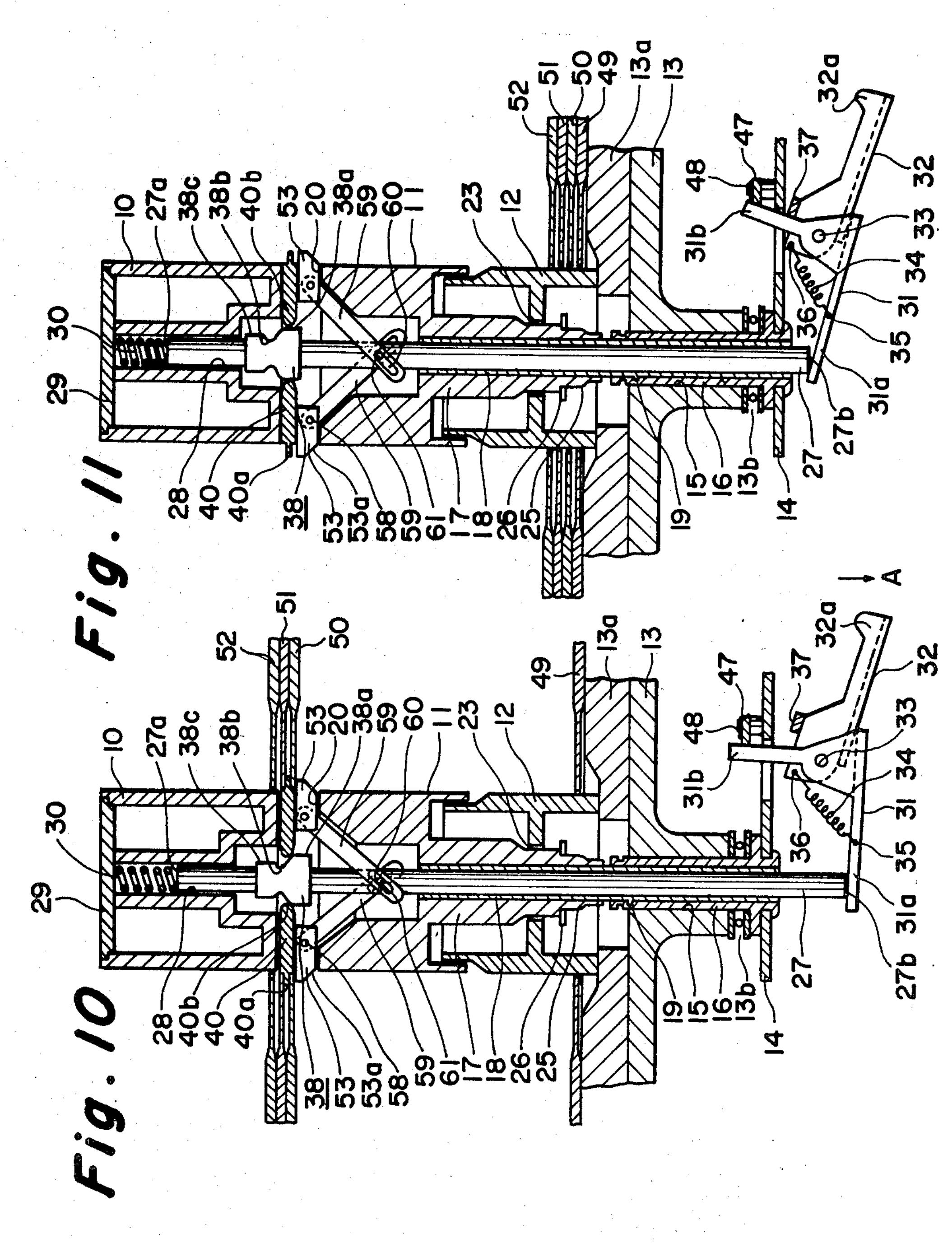
FIG. 10 is a longitudinal sectional view of the spindle device of FIG. 7 showing supported record detection means in operation when there is a record or records supported by the spindle device.
FIG. 11 is a longitudinal sectional view of the spindle device of FIG. 7 showing the supported record detection means in operation when there is no records supported by the spindle device.

When the playing of the record 49 has been completed, an automatic changing cam coupled to a pickup arm (not shown) moves the free end $32_a$ of the drive lever 32 in the direction of the arrow A as shown in FIG. 10. This causes the driven lever 31, which is connected to the drive lever 32 by the spring 34, to move in the same direction.

As a result, the lower end $27_b$ of the shaft 27 is moved upwardly by the first arm $31_a$ of the driven lever 31, resulting in the shaft 27 moving upwardly a small distance. As the shaft 27 moves upwardly, the abutting ends $40_b$, $40_b$ of the record holders 40, 40, which are maintained in engagement with the constricted portion $38_b$ of the cam 38, move as they are brought into engagement with the major cam surface $38_a$ of the cam 38. The forward ends $40_a$, $40_a$ of the record holders 40, 40 have a smaller thickness than the bases thereof so that they can be inserted between the records 50 and 51 disposed one over the other. An upper shoulder $40_c$ and lower shoulder $40_d$ are formed between the forward end $40_a$ and the base of each record holder 40. Thus, the record holders 40, 40 moved away from the cam 38 by a bevelled surface $38_d$ in the constricted portion $38_b$ are restricted in their movements by the upper shoulder $40_c$ and lower shoulder $40_d$ abutting against the inner edges of the center openings of the records 50 and 51. Because of this, the abutting ends $40_b$, $40_b$ of the record holders 40, 40 are prevented from moving to respective positions in which they are in engagement with the major cam surface $38_a$ of the cam 38, and consequently the upward movement of the shaft 27 is limited. Thus, the driven lever 31 can only move slightly in pivotal motion.

When all the records rest on the turntable 13 and no record rests on the hooks 53, 53 as shown in FIG. 11, the record holders 40, 40 can move away from the cam 38 a distance sufficiently great to permit the shaft 27 and the cam 38 mounted thereon to move upwardly a substantial distance. Accordingly, the driven lever 31 moves a substantial distance in pivotal motion about the shaft 33 together with the drive shaft 32.

Figure 12:
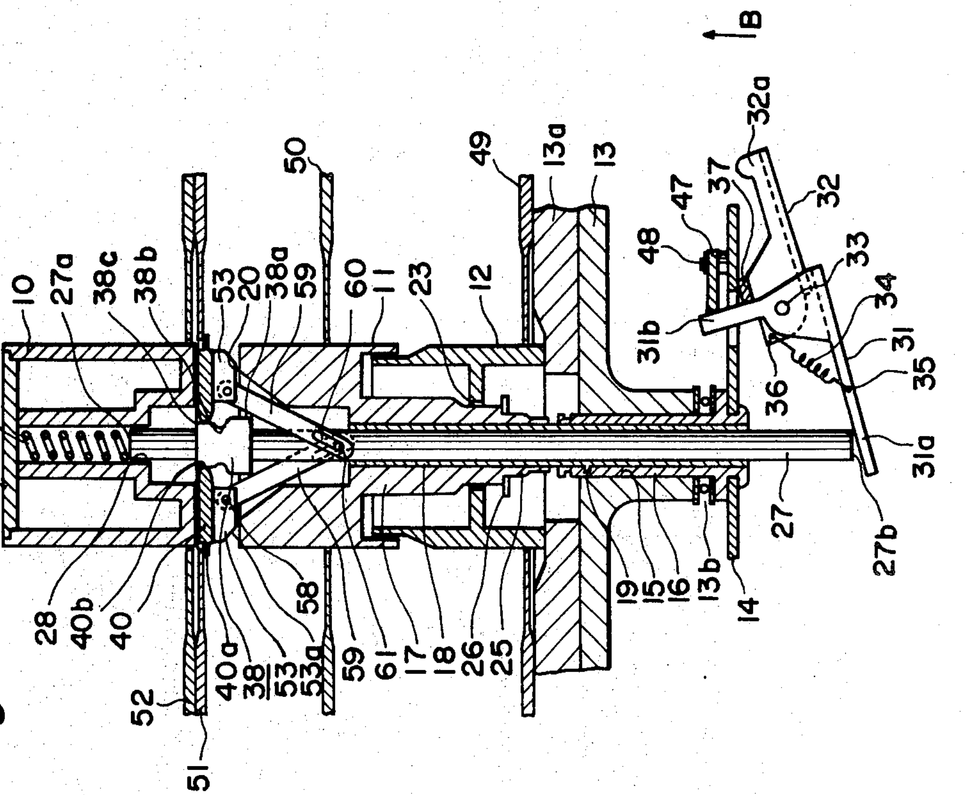
FIG. 12 is a longitudinal sectional view of the spindle device of FIG. 7 when the records are being changed.

A record changing operation will now be explained with reference to FIG. 12. After being moved in the direction of the arrow A as aforementioned, the drive lever 32 is moved in the direction of the arrow B as shown in FIG. 12. The movement of the drive lever 32 in this direction is transmitted directly to the second arm $31_b$ of the driven lever 31 through the stopper 37 of the drive lever 32, so that the lever 31 moves in pivotal motion in an anticlockwise direction about the shaft 33. This permits the shaft 27 to be moved downwardly by the biasing force of the spring 30. As a result, the cam 38 mounted on the shaft 27 also moves downwardly and the abutting ends $40_b$, $40_b$ of the record holders 40, 40 are brought into engagement with the minor cam surface $38_c$ of the cam 38, and the forward ends $40_a$, $40_a$ thereof project slightly out of the spindle body 11 through the windows 56, 56 to support the second record 51 from the bottom.

At the same time, the pin 61 provided on the shaft 27 moves downwardly with the shaft 27, so that the links 59, 59 are pulled downwardly. Since the upper end portion of each link 59 is pivotally connected to one of the hooks 53 by the shaft 58 and cannot move downwardly, the hooks 59 are withdrawn against the biasing forces of the respective springs 57, 57. Thus, the lowermost record 50 is released from engagement with the hooks 53, 53 and drops onto the turntable 13, with the rest of the records 51 and 52 being supported by the record holders 40, 40.

As the drive lever 32 is restored to its position shown in FIG. 7, the shaft 27 is also restored to its position shown in FIG. 7 and the pin 61 is also restored to its original position. This permits the hooks 53, 53 to be caused by the biasing forces of the springs 57, 57 to project out of the spindle body 11 through the windows 56, 56.

At the same time, the cam 38 is also restored to its position shown in FIG. 7, the abutting ends $40_b$, $40_b$ of the record holders 40, 40 are brought into engagement with the constricted portion $38_b$ of the cam 38 and the record holders 40, 40 are withdrawn into the spindle body 11 by the biasing forces of the respective springs 63, 63. Thus, the records 51 and 52 rest on the hooks 53, 53, and the playing of the record 50 begins.

After the playing of all the records on the hooks 53, 53 has been completed, all the records 49, 50, 51 and 52 can be removed all at once from the turntable 13 by moving them upwardly as a group.

The projecting end of each hook 53 has a bevelled underside $53_a$ which is pushed by the edges of the center openings of records, so that the hooks 53, 53 are withdrawn into the spindle body 11. At this time, the links 59, 59 pivotally connected to the respective hooks 53, 53 do not interfere with the rearward movements of the hooks 53, 53 because the links 59, 59 are pivotally supported by the engagement in the slots 60, 60 of the pin 61 attached to the shaft 27. Thus, the hooks 53, 53 do not stand in the way of removal of these records.

From the foregoing description, it will be appreciated that the present invention provides, in another embodiment, a spindle device which comprises a cam having a constricted portion in the center, a major cam surface disposed below the central constricted portion, and a minor cam surface disposed above the central constricted portion which cam is mounted on a shaft for elevational movement in a spindle and operative to cause record holders to move in and out of the spindle. Links are pivotally connected at one end portion by respective shafts to respective hooks each urged by a spring to move out of the spindle and formed with a bevelled surface at the underside of the projecting end. The links are each formed with a slot at the other end portion, and the slots in the links receive therein a pin attached to the shaft mounting the cam for elevational motion. Before the shaft is moved downwardly to change records, the shaft is moved upwardly, and at that time shoulders provided near the forward end of each record holder are brought into abutting engagement with the edges of the center openings of the records resting on the spindle, so that the amount of movements of the record holders are restricted thereby. The presence or absence of records resting on the spindle can thus be detected based on the amount of upward movement of the cam mounting shaft. It is possible to detect the presence or absence of records on the spindle by the simple operation of moving the cam mounting shaft upwardly prior to changing of records. This arrangement eliminates the need to provide in the spindle special means for detecting the presence or absence of a record or records, and prevents the construction from becoming complex. Since the hooks and record holders are not connected with each other, the record holders do not project out of the spindle even if the hooks are forced into the spindle when the records are removed. This permits the simultaneous removal of a stack of records on the turntable.

While the present invention has been described with reference to preferred embodiments, it is to be understood that the invention is not limited to the specific forms of the embodiments, and that many changes and modifications may be made therein without departing from the spirit and scope of the invention.

What is claimed is:

1. A spindle device for an automatic record changer, comprising: an elongated spindle, having a cylindrical head portion, a body portion, and a base portion of substantially equal diameter; a shaft movable longitudinally of and within said spindle; a spring normally urging said shaft downwardly; a cam member mounted on the upper portion of said shaft and having a constricted portion in the center, a first cam surface disposed below said center constricted portion, and a second cam surface having a smaller diameter than said first cam surface disposed above said center constricted portion; hook means for supporting thereon records yet to be played mounted in the upper portion of said body portion of said spindle and movable out of said spindle through windows formed in said spindle in conjunction with the movement of said shaft; record holder means mounted on said spindle above said hook means having outer end portions of a first thickness so as to be able to be inserted between said records supported on said hook means, base portions having a thickness greater than said first thickness, and shoulders formed between said outer end portions and said base portions, the outer end portions of said record holder means being movable, in conjunction with the operation of said cam member and said shaft, into a space between a lower record and an upper record disposed on said lower record to support thereon said upper record; means for moving said shaft upwardly against the operation of said spring; and means for stopping the upward movement of said shaft at two vertically spaced points as a function of the presence or absence of at least one record on said spindle, wherein when said shaft is stopped at the uppermost of the vertical positions no record is present on the hook means and further automatic operation of the spindle is stopped and when said shaft is stopped at the lower of the two vertical positions there is a record present on the hook means and normal operation of the spindle is allowed to continue.

2. The spindle device for an automatic record changer as defined in claim 1, further comprising means for urging said hook means and said record holder means into abutting engagement against said cam member and means for moving said hook means and said record holder means into and out of said spindle as a function of the movement of said cam member.

3. The spindle device for an automatic record changer as defined in claim 1, further comprising means for moving said hook means out of said spindle, comprising: links each pivotally connected at one end portion thereof to one of said hook means, slots each formed at the other end portion of said links, and a pin attached to said shaft and received in said slots.

4. The spindle device for an automatic record changer as defined in claim 1, wherein said record holder means comprises a portion pivotally supported by a further shaft, an abutting end urged by a further spring into continuous abutting engagement with one of said cam surfaces, and a forward end formed with shoulders and movable into and out of the spindle as said cam member moves up and down.

5. The spindle device for an automatic record changer as defined in claim 1, further comprising at least two record holder means arranged in juxtaposed relation to each other.

* * * * *